United States Patent
Yamada

(10) Patent No.: US 7,106,752 B2
(45) Date of Patent: Sep. 12, 2006

(54) APPARATUS FOR SCHEDULING PACKETS AND METHOD OF DOING THE SAME

(75) Inventor: Kenshin Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 1016 days.

(21) Appl. No.: 10/151,924

(22) Filed: May 22, 2002

(65) Prior Publication Data

US 2004/0213276 A1 Oct. 28, 2004

(30) Foreign Application Priority Data

May 22, 2001 (JP) ............................ 2001-151975

(51) Int. Cl.
*H04L 12/28* (2006.01)
(52) U.S. Cl. ...................................... 370/412; 370/468
(58) Field of Classification Search ................ 370/412, 370/468, 395.4, 395.42, 395.43, 395.7, 413, 370/414, 415, 416, 417, 418, 389, 229
See application file for complete search history.

(56) References Cited

U.S. PATENT DOCUMENTS 7,016,366 B1 * 3/2006 Kawarai et al. ............ 370/413

FOREIGN PATENT DOCUMENTS

| JP | 9-83547 | 9/1997 |
| JP | 10-84383 | 3/1998 |
| JP | 10-200532 | 7/1998 |
| JP | 11-239151 | 8/1999 |
| JP | 11-252097 | 9/1999 |
| JP | 2000-299686 | 10/2000 |
| JP | 2001-53807 | 2/2001 |

* cited by examiner

*Primary Examiner*—Chi Pham
*Assistant Examiner*—Alexander O. Boakye
(74) *Attorney, Agent, or Firm*—McGinn IP Law Group, PLLC

(57) ABSTRACT

An apparatus for scheduling packets for presenting a plurality of classes, includes (a) a buffer which accumulates received packets in each of the classes, (b) a token administrator which judges whether it is allowed to transmit a packet in each of the classes by virtue of a token associated with each of the classes, (c) a scheduler which determines a class to which a packet to be transmitted belongs, based on the judgment carried out by the token administrator, and (d) a controller which reads a packet of the class determined by the scheduler, out of the buffer, and transmits the thus read-out packet. The token administrator includes a single first circuit for carrying out subtraction of a token and a single second circuit for carrying out addition of a token, and carries out subtraction and addition of a token for each of the classes by means of the single first circuit and the single second circuit.

14 Claims, 13 Drawing Sheets

FIG.4

| CLASS NO. | WEIGHT | MAX. TOKEN | TOKEN | TIME-OUT FLAG |
|---|---|---|---|---|
| 1 | 3 | 30 | 30 | 0 |
| 2 | 2 | 20 | 23 | 0 |
| 3 | 5 | 40 | 23 | 0 |
| 4 | 4 | 20 | 81 | 1 |

FIG.8A

ADST = 20     ST = 25

| CLASS NO. | WEIGHT | MAX. TOKEN | TOKEN | TIME-OUT FLAG |
|---|---|---|---|---|
| 1 | 3 | 30 | 30 | 0 |
| 2 | 2 | 20 | 23 | 0 |
| 3 | 5 | 40 | 23 | 0 |
| 4 | 4 | 20 | 81 | 1 |

| BIT |
|---|
| 1 |
| 0 |
| 0 |
| 1 |

| TOKEN |
|---|
| 5 |
| -2 |
| -2 |
| 20 |

FIG.8B

ADST = 20    ST = 25

| CLASS NO. | WEIGHT | MAX. TOKEN | TOKEN | TIME-OUT FLAG |
|---|---|---|---|---|
| 1 | 3 | 30 | 22 | 0 |
| 2 | 2 | 20 | 23 | 0 |
| 3 | 5 | 40 | 23 | 0 |
| 4 | 4 | 20 | 81 | 1 |

| BIT |
|---|
| 0 |
| 0 |
| 0 |
| 1 |

| TOKEN |
|---|
| -3 |
| -2 |
| -2 |
| 20 |

FIG.8C

ADST = 20     ST = 25

| CLASS NO. | WEIGHT | MAX. TOKEN | TOKEN | TIME-OUT FLAG |
|---|---|---|---|---|
| 1 | 3 | 30 | 22 | 0 |
| 2 | 2 | 20 | 23 | 0 |
| 3 | 5 | 40 | 23 | 0 |
| 4 | 4 | 20 | 37 | 0 |

| BIT |
|---|
| 0 |
| 0 |
| 0 |
| 1 |

| TOKEN |
|---|
| -3 |
| -2 |
| -2 |
| 12 |

FIG.8D

ADST = 20     ST = 5 (25 − 20)

| CLASS NO. | WEIGHT | MAX. TOKEN | TOKEN | TIME-OUT FLAG |
|---|---|---|---|---|
| 1 | 3 | 30 | 22 | 0 |
| 2 | 2 | 20 | 23 | 0 |
| 3 | 5 | 40 | 23 | 0 |
| 4 | 4 | 20 | 37 | 1 |

| BIT |
|---|
| 1 |
| 1 |
| 1 |
| 1 |

| TOKEN |
|---|
| 17 |
| 18 |
| 18 |
| 20 |

APPARATUS FOR SCHEDULING PACKETS AND METHOD OF DOING THE SAME

BACKGROUND OF THE INVENTION

1. Field of the Invention

The invention relates to an apparatus for scheduling packets and a method of doing the same, and more particularly to such an apparatus and a method which accumulates packets in packet cues in dependence on a class.

2. Description of the Related Art

In a field of exchanging packets, quality of service (QOA) guaranteed by a network is grouped into a plurality of ranks or kinds called classes. A network for exchanging packets assigns a wide bandwidth to a packet belonging o a class having high priority, and assigns a narrow bandwidth to a packet belonging to a class having low priority, to thereby guarantee quality of service for each of classes.

A packet exchanger in a network for exchanging packets usually includes an apparatus for scheduling packets for determining an order in which received packets are transmitted, in order to guarantee quality of service which is different from others in classes. FIG. 1 is a block diagram of a conventional apparatus for scheduling packets.

The apparatus for scheduling packets, illustrated in FIG. 1, carries out weighted round robin (WRR) scheduling. The weighted round robin scheduling is characterized in that it is not necessary to sort received packets, it is possible to assign a maximum transmission bandwidth to each of classes, and there is no problem that packets belonging to the same class are continuously transmitted, in other words, the weighted round robin scheduling has superior fairness characteristic.

The apparatus for scheduling packets, illustrated in FIG. 1, is comprised of a common buffer 1, a packet-writing controller 2, a packet-reading controller 3, a cue length administrator 4, a scheduler 5, and a token administrator 6.

The common buffer 1 includes N packet cues associated with classes #1 to #N.

On receipt of a packet, the packet-writing controller 2 identifies a class to which the received packet belongs, based on data stored in a header field of the received packet. Based on the identification, the packet-writing controller 2 writes the received packet into a packet cue associated with the identified class. In addition, the packet-writing controller 2 transmits data such as a class and a length of the received packet to the cue length administrator 4 as packet-writing data.

The packet-reading controller 3 reads a header packet out of a packet cue associated with a class identified by the scheduler 5 by means of an output class number OC, and outputs the thus read-out packet. The packet-reading controller 3 transmits a length of the read-out packet PL together with the output class number OC to the token administrator 6. In addition, the packet-reading controller 3 transmits data such as a class and a length of the read-out packet to the cue length administrator 4 as packet-reading data.

The cue length administrator 4 administers a number of and lengths of packets stored in each of the packet cues, based on the packet-writing data received from the packet-writing controller 2 and the packet-reading data received from the packet-reading controller 3.

The cue length administrator 4 transmits an effective packet bit series VS to the scheduler 5. The effective packet bit series indicates whether a transmittable packet is accumulated in each of the packet cues #1 to #N. The effective packet bit is comprised of a bit series signal having N bits where each of bits corresponds to each of the packet cues one by one. That is, the effective packet bit series indicates "1" for a bit in which a transmittable packet is accumulated in the associated packet cue, and indicates "0" for a bit in which a transmittable packet is not accumulated in the associated packet cue.

The scheduler 5 determines a class to which a packet to be transmitted next belongs, based on both the effective packet bit series VS received from the cue length administrator 4 and a transmission allowance bit series SS received from the token administrator 6, and transmits the thus determined class to the packet-reading controller 3 as the above mentioned output class number OC. Herein, the transmission allowance bit series SS is comprised of a bit series signal having N bits where each of bits corresponds to each of the classes one by one. That is, a bit associated with a class where the token administrator 6 allows transmission of a packet is expressed as "1", and a bit associated with a class where the token administrator 6 does not allow transmission of a packet is expressed as "0".

The scheduler 5 selects one class in round robin fashion among classes where both of the effective packet bit series VS and the transmission allowance bit series indicate "1". The output class number OC is a number of the thus selected class.

The scheduler 5 transmits a request AR of addition of a token to the token administrator 6, when predetermined conditions are satisfied. The predetermined conditions are dependent on an algorithm defining an operation of the scheduler 5. There are two typical conditions as the predetermined conditions, as follows.

One of the typical conditions is that there is no packet to be transmitted. That is, there is not a class where both of the effective packet bit series VS and the transmission allowance bit series SS indicate "1". In a packet scheduling apparatus in which the scheduler 5 transmits a request AR of addition of a token to the token administrator 6 when there is no packet to be transmitted, it would be possible to transmit packets in accordance with a bandwidth ratio determined in each of classes. In such a packet scheduling apparatus, if input traffic is small in a certain class, the rest of bandwidth is used in accordance with a bandwidth of other classes in order to transmit packets of the other classes.

The other of the typical conditions is that a predetermined period of time has passed. In this case, the scheduler 5 periodically transmits a request of addition of a token to the token administrator 6. In a packet scheduling apparatus in which a request of addition of a token is periodically transmitted to the token administrator 6, it would be possible to set a maximum transmission rate in each of classes. This is effective to not only a class or packet cue controlled by a round robin scheduler, but also to a packet of a class for best effort.

The token administrator 6 administers a token for each of classes. Specifically, on receipt of a request of addition of a token from the scheduler 5, the token administrator 6 adds an additional token weighted with a weight in advance defined for each of classes, to a token associated with each of classes.

In addition, on receipt of an output class number and a packet length from the packet-reading controller 3, the token administrator 6 subtracts a token equivalent to the received packet length from a token of the associated class. Then, the token administrator 6 compares a token of each of classes to a predetermined token. If a token is equal to or greater than the predetermined token, the token administrator 6 transmits a transmission allowance bit series SS in which the associated bit is set equal to 1, whereas if a token is smaller than the predetermined token, the token administrator 6 transmits a transmission allowance bit series SS in which the associated bit is set equal to zero.

FIG. 2 is a block diagram of the token administrator 6.

As illustrated in FIG. 2, the token administrator 6 is comprised of first to N-th circuits 7-1 to 7-N (N is an integer equal to or greater than 2) each carrying out addition and subtraction of a token in each of classes, and a circuit 8 for updating a transmission allowance flag, electrically connected to each of the first to N-th circuits 7-1 to 7-N.

Each of the first to N-th circuits 7-1 to 7-N stores a token which is a variable, an additional token and a maximum token as parameters. The additional token and the maximum token are in advance determined for each of classes.

On receipt of a request of addition of a token from the scheduler 5, each of the first to N-th circuits 7-1 to 7-N adds the additional token to a token. If a sum of the additional token and a token were over the maximum token, each of the first to N-th circuits 7-1 to 7-N equalizes a token to the maximum token.

When each of the first to N-th circuits 7-1 to 7-N receives an output class number from the packet-reading controller 3 which number is a number of a class of which each of the first to N-th circuits 7-1 to 7-N is in charge, each of the first to N-th circuits 7-1 to 7-N subtracts a token equivalent to the packet length transmitted from the packet-reading controller 3, from a token.

After addition or subtraction of a token, if a token is equal to or greater than zero, each of the first to N-th circuits 7-1 to 7-N transmits a request to the flag updating circuit 8 to set a transmission allowance bit of the associated class equal to 1, whereas if a token is smaller than zero, each of the first to N-th circuits 7-1 to 7-N transmits a request to the flag updating circuit 8 to set a transmission allowance bit of the associated class equal to zero.

The circuit 8 for updating a transmission allowance flag has transmission allowance flags associated with the classes. The circuit 8 turns the transmission allowance flags to 1 or 0 in compliance with a request transmitted from each of the first to N-th circuits 7-1 to 7-N. The transmission allowance flags are output to the scheduler 5 from the circuit 8 as the transmission allowance bit series SS.

In such a manner as mentioned above, the conventional packet scheduling apparatus transmits packets having been grouped into each of classes, to each of classes with quality of service associated with each of classes being guaranteed.

The above-mentioned conventional apparatus for scheduling packets is necessary to include a token register for storing a token therein, and a circuit for carrying out addition or subtraction of a token, for each of classes. Accordingly, if a number of classes is to be increased, it would be unavoidable for the conventional packet scheduling apparatus to become larger in a size. Thus, the conventional packet scheduling apparatus is accompanied with a problem that a maximum number of classes is about 10 at greatest.

An apparatus for scheduling packets in weighted round robin (WRR) scheduling process is suggested, for instance, in Japanese Unexamined Patent Publications Nos. 9-83547, 10-84383, 10-200532, 2000-299686 and 2001-53807. However, the apparatuses suggested in these Publications are accompanied with a problem that an increase in a number of classes would cause an increase in a size of an apparatus, similarly to the above-mentioned conventional packet scheduling apparatus.

SUMMARY OF THE INVENTION

In view of the above-mentioned problems in the conventional apparatus for scheduling packets, it is an object of the present invention to provide an apparatus and a method for scheduling packets both of which are capable of presenting hundreds of classes without an increase in a size of the apparatus.

In one aspect of the present invention, there is provided an apparatus for scheduling packets for presenting a plurality of classes, including (a) a buffer which accumulates received packets in each of the classes, (b) a token administrator which judges whether it is allowed to transmit a packet in each of the classes by virtue of a token associated with each of the classes, (c) a scheduler which determines a class to which a packet to be transmitted belongs, based on the judgment carried out by the token administrator, and (d) a controller which reads a packet of the class determined by the scheduler, out of the buffer, and transmits the thus read-out packet. The token administrator includes a single first circuit for carrying out subtraction of a token and a single second circuit for carrying out addition of a token, and carries out subtraction and addition of a token for each of the classes by means of the single first circuit and the single second circuit.

Under the assumption that the token administrator allows transmission of a packet, if the token is equal to or greater than a predetermined token, and does not allow transmission of a packet, if the token is smaller than the predetermined token, it is preferable that the token administrator defines A/B as a unit of the token, wherein A indicates bytes and B indicates a weight, such that when the token administrator adds an additional token to each of tokens associated with each of the classes in accordance with a weight of each of the classes, in compliance with a request from the scheduler, an additional token can be added to each of tokens associated with each of the classes in accordance with a weight of each of the classes, if only the predetermined token is reduced by a certain value, and the second circuit reduces the predetermined token by a certain value in compliance with the request.

It is preferable that the first circuit receives an output class number and a packet length from the controller, and subtracts a token defined in accordance with the packet length from a token associated with a class defined by the output class number.

For instance, the token administrator may includes (b1) a parameter memory storing therein a token of each of the classes, (b2) a first circuit which receives an output class number and a packet length from the controller, reads a token of a class identified by the output class number, out of the parameter memory, subtracts a subtractive token determined in accordance with the packet length, from the thus read-out token, writes a resultant token into the parameter memory, compares the resultant token to a predetermined token, and transmits a first request of transmitting a packet, based on the result of the comparison, (b3) a second circuit which reduces the predetermined token by a certain degree in compliance with a request transmitted from the scheduler to thereby substantially increase a token, and transmits a second request of transmitting a packet, and (b4) a third circuit which produces a bit series indicative of whether a packet of each of the classes is allowed to be transmitted, on receipt of the first and second requests.

It is preferable that the token administrator further includes an access control circuit which administers access to the parameter memory.

It is preferable that the token administrator further includes a time-out monitoring circuit which periodically monitors a token of each of the classes stored in the parameter memory, judges whether it is timed out or not, based on a maximum token defined in each of the classes, and stores a time-out flag in the parameter memory in association with the token, and wherein the first circuit, when the token read out of the parameter memory is associated with the time-out flag, converts the token into a token defined in accordance with the maximum token, and subtracts the subtractive token from the thus converted token to thereby newly have a token.

It is preferable that the token administrator further includes a fourth circuit for updating a maximum token flag, which, on receipt of a request of addition of a token from the scheduler, turns on a class allowed to be transmitted by the bit series among maximum token flags associated with the classes, and turns off a maximum token flag associated with a class identified with a request transmitted from the first circuit, in which case, it is preferable that the first circuit stores a maximum token common in all of the classes, searches a maximum token flag associated with a class identified by an output class number transmitted from the controller, among the maximum token flags stored in the fourth circuit, converts the token read out of the parameter memory, into a predetermined token, if the maximum token flag is on, and subtracts a subtractive token from the thus converted token to newly have a token.

In another aspect of the present invention, there is provided a token administrator, used in a packet scheduling apparatus which presents a plurality of classes, which increases a token associated with each of classes in accordance with a weight of each of classes in compliance with a request from a scheduler, and reduces a token associated with a class to which a packet transmitted in accordance with a signal transmitted from a controller belongs, in accordance with a length of the packet, the token administrator including (a) a parameter memory storing therein a token of each of the classes, (b) a first circuit which receives an output class number and a packet length from the controller, reads a token of a class identified by the output class number, out of the parameter memory, subtracts a subtractive token determined in accordance with the packet length, from the thus read-out token, writes a resultant token into the parameter memory, compares the resultant token to a predetermined token, and transmits a first request of transmitting a packet, based on the result of the comparison, (c) a second circuit which reduces the predetermined token by a certain degree in compliance with a request transmitted from the scheduler to thereby substantially increase a token, and transmits a second request of transmitting a packet, and (d) a third circuit which produces a bit series indicative of whether a packet of each of the classes is allowed to be transmitted, on receipt of the first and second requests.

It is preferable that the token administrator further includes an access control circuit which administers access to the parameter memory.

It is preferable that the token administrator further includes a time-out monitoring circuit which periodically monitors a token of each of the classes stored in the parameter memory, judges whether it is timed out or not, based on a maximum token defined in each of the classes, and stores a time-out flag in the parameter memory in association with the token, in which case, it is preferable that the first circuit, when the token read out of the parameter memory is associated with the time-out flag, converts the token into a token defined in accordance with the maximum token, and subtracts the subtractive token from the thus converted token to thereby newly have a token.

It is preferable that the token administrator further includes a fourth circuit for updating a maximum token flag, which, on receipt of a request of addition of a token from the scheduler, turns on a class allowed to be transmitted by the bit series among maximum token flags associated with the classes, and turns off a maximum token flag associated with a class identified with a request transmitted from the first circuit, in which case, the first circuit stores a maximum token common in all of the classes, searches a maximum token flag associated with a class identified by an output class number transmitted from the controller, among the maximum token flags stored in the fourth circuit, converts the token read out of the parameter memory, into a predetermined token, if the maximum token flag is on, and subtracts a subtractive token from the thus converted token to newly have a token.

In still another aspect of the present invention, there is provided a method of scheduling packets for presenting a plurality of classes, including the steps of (a) accumulating received packets in each of the classes, (b) judging whether it is allowed to transmit a packet in each of the classes by virtue of a token associated with each of the classes, and (c) determining a class to which a packet to be transmitted belongs, based on the judgment carried out in the step (b), wherein the token has A/B as a unit thereof wherein A indicates bytes and B indicates a weight, ensuring that a step of adding a token defined in accordance with a weight of each of the classes, to a token of all of the classes can be carried out by adding the same token to the classes.

It is preferable that the method further includes the steps of allowing transmission of a packet only when the token is equal to or greater than a predetermined token, and reducing the predetermined token by a certain degree to thereby make it no longer necessary to add a token defined in accordance with a weight of each of the classes, to tokens of the classes.

It is preferable that the method further includes the steps of reducing the predetermined token by the certain degree, if necessary, and reducing a token associated with a class to which a packet having been transmitted belongs, by a length of the packet divided by a weight of the class.

The advantages obtained by the aforementioned present invention will be described hereinbelow.

In the above-mentioned conventional apparatus for scheduling packets, a token is expressed in the unit of a byte, similarly to a size of a packet. In contrast, in accordance with the present invention, a token is expressed in the unit of A/B wherein A indicates a byte of a packet, and B indicates a weight assigned to each of classes. In addition, a token T and a predetermined standard token S are in advance defined such that an actual token X is calculated by subtracting the predetermined standard token S from the token T ($X=T-S$). Herein, the token T is defined for each of classes, and the predetermined standard token S is common to all of classes.

When a request of addition of a token is transmitted, the predetermined standard token S which is common to all of classes is reduced by a certain degree, in place of adding a token defined in accordance with a weight to each of classes or changing a token in each of classes. Since a token has the unit of a byte of a packet divided by a weight (A/B), it would be possible to carry out addition of a token in accordance with a weight of each of classes. Thus, it is possible to replace a plurality of adder circuits associated with a plurality of classes with a single subtraction circuit.

In addition, in accordance with the present invention, it would be possible to administer tokens of all of classes by means of a single subtraction circuit and a single addition circuit regardless of a number of classes.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 illustrates an example of a parameter table stored in the parameter memory illustrated in FIG. 3.

FIGS. 8A, 8B, 8C and 8D illustrate a content of the parameter table illustrated in FIG. 4.

DESCRIPTION OF THE PREFERRED EMBODIMENTS

Preferred embodiments in accordance with the present invention will be explained hereinbelow with reference to drawings.

FIRST EMBODIMENT

Figure 1:
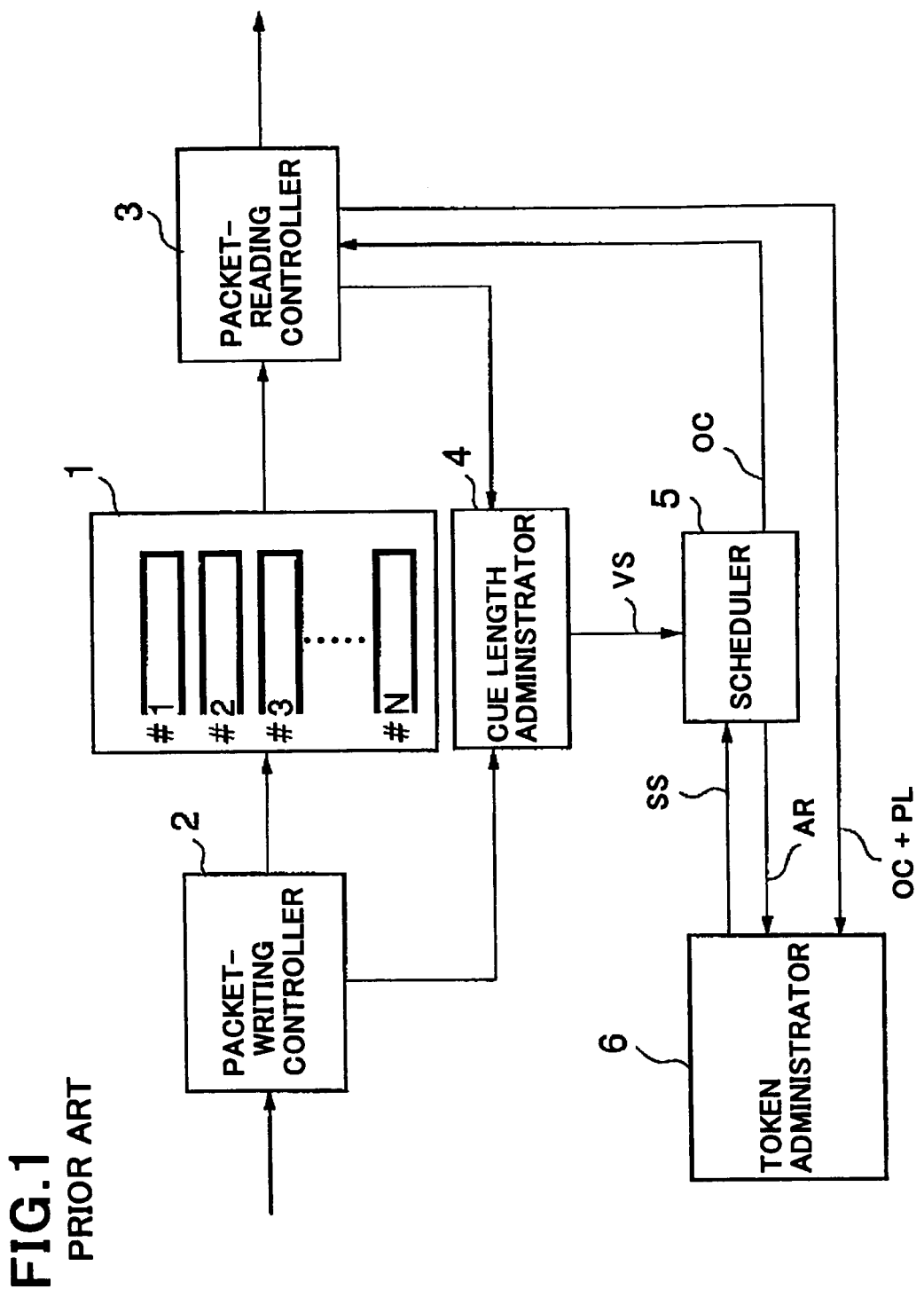
FIG. 1 is a block diagram of an apparatus for scheduling packets.
Figure 2:
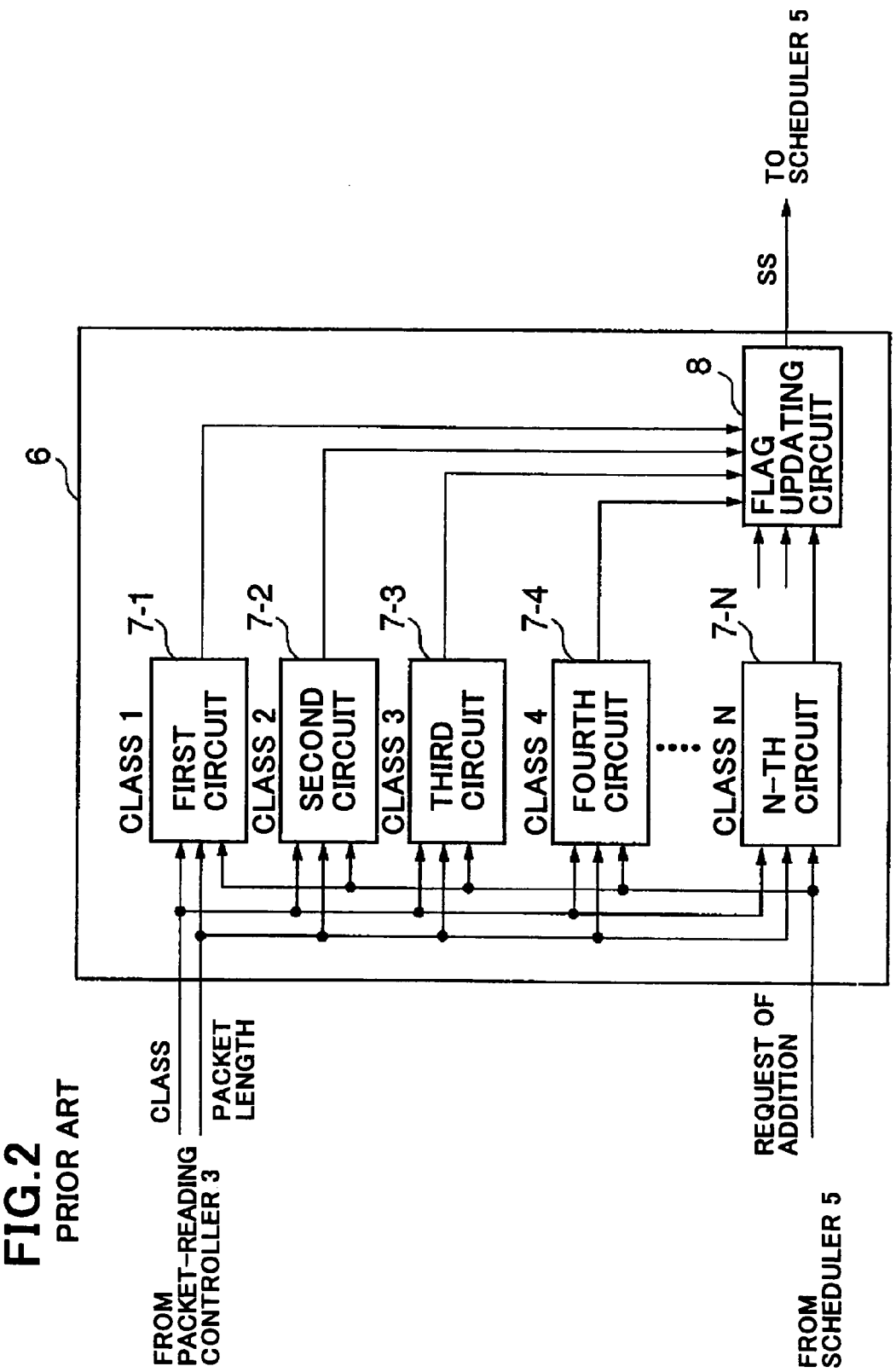
FIG. 2 is a block diagram of a conventional token administrator.

An apparatus for scheduling packets, in accordance with the first embodiment has the same structure as the structure of the conventional apparatus for scheduling packets, illustrated in FIG. 1 except including a token administrator 6A in place of the token administrator 6 illustrated in FIG. 1. Accordingly, hereinbelow is explained only the token administrator 6A in the first embodiment.

Figure 3:
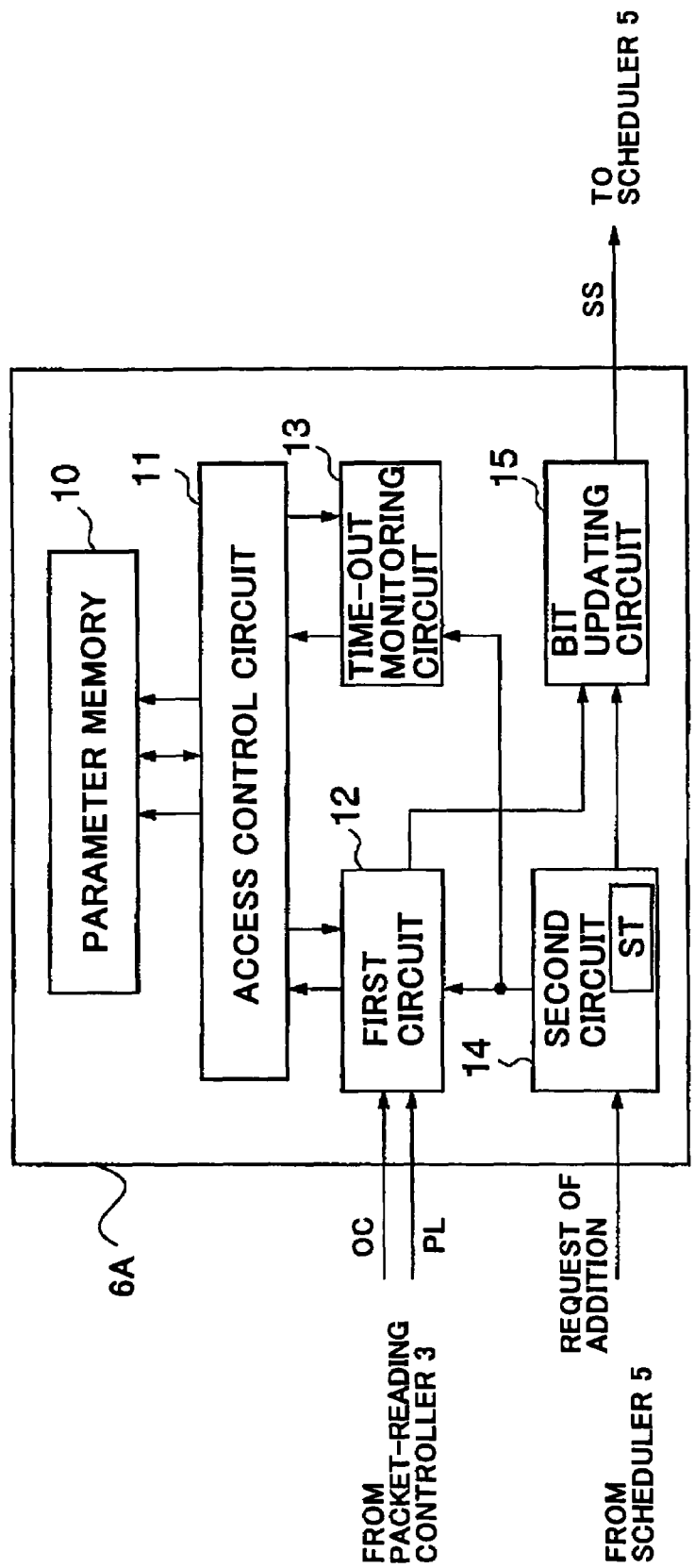
FIG. 3 is a block diagram of a token administrator which is a part of the apparatus for scheduling packets, in accordance with the first embodiment of the present invention.

FIG. 3 is a block diagram of the token administrator 6A in the first embodiment.

The token administrator 6A is comprised of a parameter memory 10, a circuit 11 which controls access to the parameter memory 10, a first circuit 12 for carrying out subtraction of a token, a circuit 13 which monitors whether it is time-out, a second circuit 14 for carrying out addition of a token, and a circuit 15 which updates a transmission allowance bit.

The parameter memory 10 stores four parameters for each of classes, that is, a token, a weight, a maximum token, and a time-out flag.

FIG. 4 illustrates an example of a parameter table, that is, what is stored in the parameter memory 10.

The parameter table illustrated in FIG. 4 has four classes, and stores weights and maximum tokens different from others in each of classes. A token is a variable resulted from an operation of the packet scheduling apparatus until then, and similarly, a time-out flag is a flag resulted from an operation of the packet scheduling apparatus until then.

A token used in the first embodiment is different from a token used in the conventional packet scheduling apparatus. That is, a token used in the conventional packet scheduling apparatus is expressed in the unit of a byte, whereas a token in the first embodiment is expressed in the unit of A/B where A indicates a byte and B indicates a weight.

Referring back to FIG. 3, the access control circuit 11 writes a parameter into the parameter memory 10 or reads parameters out of the parameter memory 10 in compliance with requests received from the first circuit 11 and the time-out monitoring circuit 13.

The first circuit 12 receives an output class number OC and a packet length PL from the packet-reading controller 3 (see FIG. 1), and, on receipt of them, transmits a request to the access control circuit 11 to read parameters associated with a class identified by the output class number OC, out of the parameter memory 10. On receipt of the parameter having been read out of the parameter memory 10, from the access control circuit 11, the first circuit 12 subtracts a token equivalent to a packet length PL transmitted from the packet-reading controller 3, from a token included in the parameter. Herein, a token equivalent to a packet length PL is equal to a packet length divided by a weight.

Then, the first circuit 12 requests the access control circuit 11 to write the thus updated token into the parameter memory 10.

Further, the first circuit 12 compares the thus updated token to a predetermined standard token ST stored in the second circuit 14. If the updated token is smaller than the predetermined standard token ST, the first circuit 12 requests the bit updating circuit 15 to set a transmission allowance bit equal to zero. In other words, defining an updated token Tu as a token T from which the predetermined standard token ST is subtracted (Tu=T−ST), if the updated token Tu becomes negative, the first circuit 12 requests the bit updating circuit 15 to set a transmission allowance bit equal to zero.

The second circuit 14 stores the above-mentioned predetermined standard token ST therein. On receipt of a request of addition of a token from the scheduler 5 (see FIG. 1), the second circuit 14 reduces the predetermined standard token ST by a certain token (hereinafter, "certain token" is referred to as "additional standard token"). The additional standard token is defined such that packet transmission is allowed for all of classes, if judged based on an updated standard token, regardless of tokens in the classes. Specifically, the additional standard token is defined to be greater than M/L where M indicates a maximum length of a packet and L indicates a minimum weight.

After subtracting the additional standard token from the standard token ST, the second circuit 14 assumes that packet transmission for all of classes is allowed, and requests the bit updating circuit 15 to set transmission allowance bits for all of classes equal to one (1).

The time-out monitoring circuit 13 requests the access control circuit 11 to periodically read parameters of each of classes in turn out of the parameter memory 10. Then, based on the parameters read out of the parameter memory 10 by the access control circuit 11, the time-out monitoring circuit 13 compares a token to a sum of a maximum token and a standard token in each of classes. If a token is equal to or smaller than a sum of a maximum token and a standard token, the time-out monitoring circuit 13 judges that there does not occur time-out yet, and then, sets a time-out flag to be zero or turns a time-out flag off. On the other hand, if a token is greater than a sum of a maximum token and a standard token, the time-out monitoring circuit 13 judges that there has occurred time-out, and then, sets a time-out flag to be one or turns a time-out flag on.

The bit updating circuit 15 updates a transmission allowance bit SS in compliance with requests transmitted from the first and second circuits 12 and 14, and outputs the thus updated transmission allowance bit SS to the scheduler 5 (see FIG. 1).

Hereinbelow is explained an operation of the token administrator 6A with reference to FIGS. 5 to 7.

The token administrator 6A illustrated in FIG. 3 carries out three major processes. In the first process, the token administrator 6A carries out addition of a token, when the token administrator 6A receives a request of addition of a token from the scheduler 5. In the second process, the token administrator 6A carries out subtraction of a token in an associated class, when the token administrator 6A receives a request of subtraction of a token, comprised of an output class number and a packet length, from the packet-reading controller 3. In the third process, the token administrator 6A makes access in turn to parameters of each of classes, stored in the parameter memory 10, and carries out time-out judgment.

Hereinbelow the above-mentioned first to third processes are explained in detail with reference to FIGS. 5 to 7, respectively.

Figure 5:
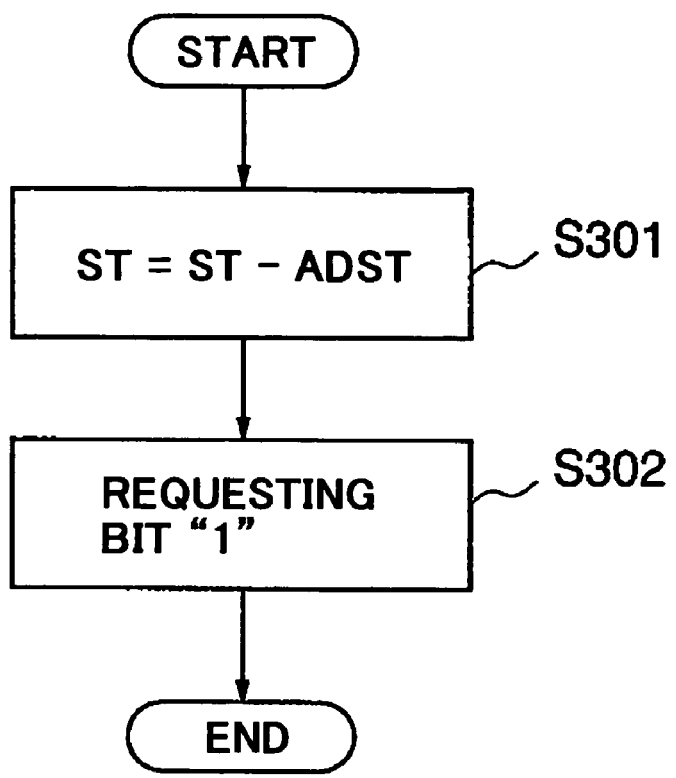
FIG. 5 is a flow chart of a process of addition of a token, carried out by the token administrator illustrated in FIG. 3.

The first process is carried out in the second circuit 14 in such a way as illustrated in FIG. 5.

On receipt of a request of addition of a token, the second circuit 14 updates a standard token ST by subtracting an addition standard token ADST from a present standard token ST (ST=ST−ADST), in step S301.

Then, the second circuit 14 requests the bit updating circuit 15 to set transmission allowance bits in all of classes equal to one (1), in step S302.

Figure 6:
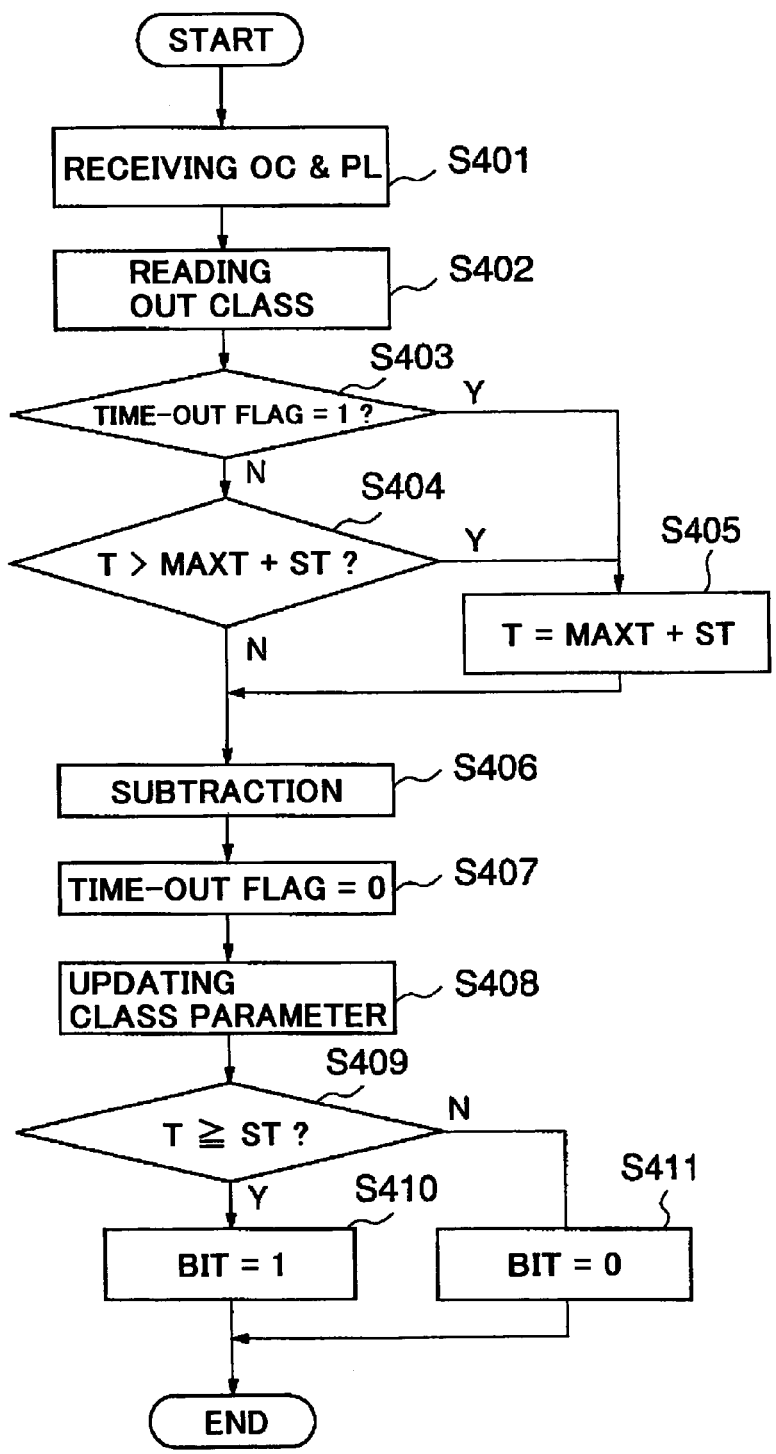
FIG. 6 is a flow chart of a process of subtraction of a token, carried out by the token administrator illustrated in FIG. 3.

The second process is carried out in the first circuit 12 in such a way as illustrated in FIG. 6.

The first circuit 12 receives an output class number OC and a packet length PL from the packet-reading controller 3, in step S401.

On receipt of them, the first circuit 12 reads parameters associated with classes identified with the output class number OC, out of the parameter memory 10 through the access control circuit 11, in step S402.

Then, the first circuit 12 checks whether a time-out flag indicates one (1) in step S403.

If the time-out flag indicates zero (NO in step S403), the first circuit 12 checks whether a token T is greater than a sum of a maximum token MAXT and a standard token ST, in step S404.

If the time-out flag indicates one (1) (YES in step S403), or if a token T is greater than a sum of a maximum token MAXT and a standard token ST (YES in step S404), the first circuit 12 equalizes a token T to a sum of a maximum token MAXT and a standard token ST, in step S405.

Then, the first circuit 12 subtracts A/B from a token where A indicates a packet length PL received from the packet-reading controller 3, and B indicates a weight, in step S406.

Then, the first circuit 12 sets a time-out flag to be zero, in step S407.

Then, the first circuit 12 stores the thus updated token and time-out flag into the parameter memory 10 through the access control circuit 11, in step S408.

Then, the first circuit 12 checks whether a token T is equal to or greater than a standard token ST, in step S409.

If a token T is equal to or greater than the standard token ST (YES in step S409), the first circuit 12 sets a transmission allowance bit to be one (1), in step S410. If a token T is smaller than the standard token ST (NO in step S409), the first circuit 12 sets a transmission allowance bit to be zero (0), in step S411.

Figure 7:
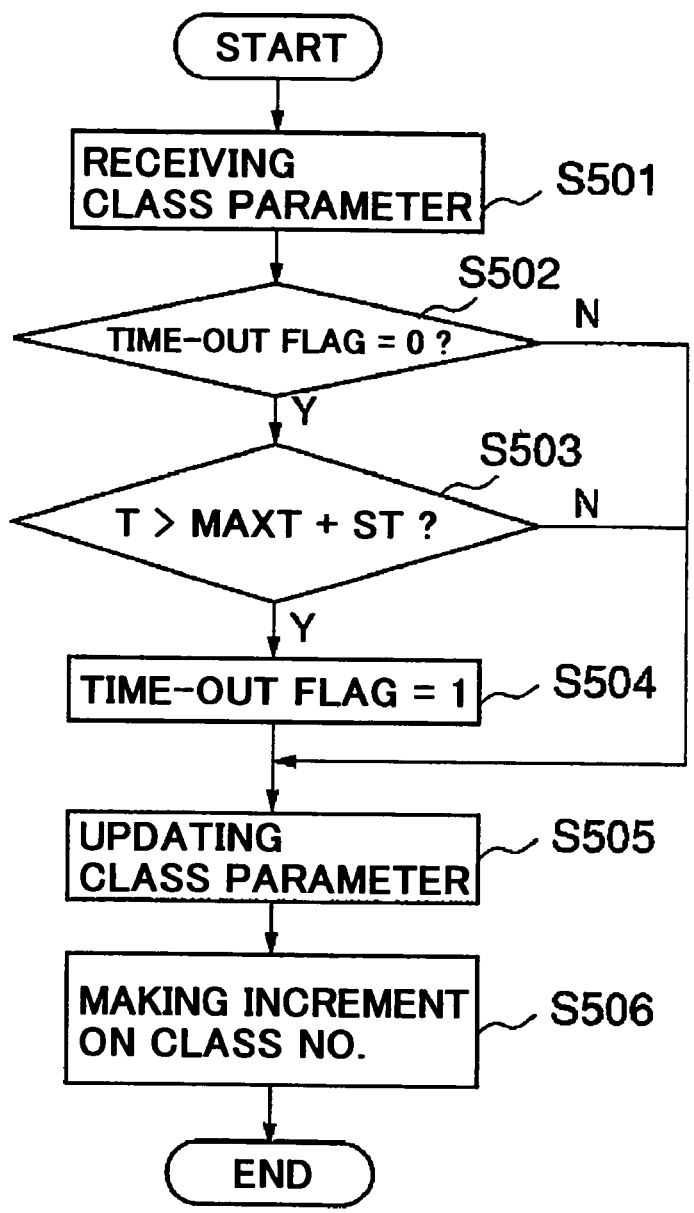
FIG. 7 is a flow chart of a process of time-out judgment, carried out by the token administrator illustrated in FIG. 3.

The third process is carried out in the time-out monitoring circuit 13 in such a way as illustrated in FIG. 7.

The time-out monitoring circuit 13 reads parameters of a class to which whether it is time-out or not is judged, out of the parameter memory 10 through the access control circuit 11, in step S501. Though all classes are to be judged as to whether it is time-out or not, parameters associated with one class is read out of the parameter memory 10 at a time. That is, after time-out monitoring process is finished for a certain class, next time-out monitoring process begins for a next class. Thus, a time-out monitoring process is carried out for all of classes in a certain interval class by class.

Then, the time-out monitoring circuit 13 checks whether the time-out flag indicates zero, in step S502.

If the time-out flag indicates zero (YES in step S502), the time-out monitoring circuit 13 checks whether a token T is greater than a sum of a maximum token MAXT and a standard token ST, in step S503.

If a token T is greater than a sum of a maximum token MAXT and a standard token ST (YES in step S503), the time-out monitoring circuit 13 judges that it is time-out, and sets the time-out flag to be one (1), in step S504.

If the time-out flag indicates one (1) (NO in step S502), or when the time-out flag is turned into one (1) in step S504, the time-out monitoring circuit 13 sets a time-out flag of a class which is stored in the parameter memory 10 and to which time-out judgment is carried out, to be one (1) through the access control circuit 11, in step S505.

If a token T is equal to or smaller than a sum of a maximum token MAXT and a standard token ST (NO in step S503), the time-out monitoring circuit 13 sets a time-out flag of a class which is stored in the parameter memory 10 and to which time-out judgment is carried out, to be zero (0) through the access control circuit 11, in step S505.

Then, the time-out monitoring circuit 13 makes one increment on a class to which time-out judgment is carried out, that is, turns a present class into a next class, in step S506.

Thus, the third process is completed for one class. Hereinafter, the time-out monitoring circuit 13 repeats the third process in a certain interval.

The token administrator 6A in the first embodiment carries out the first process of carrying out addition of a token, the second process of carrying out subtraction of a token, and the third process of judging whether it is time out, in such a manner as mentioned above.

FIGS. 8A to 8D illustrate how the parameters stored in the parameter memory 10 are varied after the above-mentioned first to third processes have been carried out. It is assumed that parameters illustrated in FIG. 8A are stored in the parameter memory 10 as initial parameters.

As illustrated in FIG. 8A, the token administrator 6A is associated with four classes each having a class number 1, 2, 3 and 4, respectively. Weights 3, 2, 5 and 4 and maximum tokens 30, 20, 40 and 20 are assigned to the classes 1 to 4, respectively. Tokens 30, 23, 23 and 81 are assigned to each of the classes 1 to 4. A time-out flag 0 is assigned to each of the classes 1 to 3, and a time-out flag 1 is assigned to the class 4.

It is further assumed that the bit updating circuit 15 outputs a transmission allowance bit series SS of 1 to the classes 1 and 4, and a transmission allowance bit series SS of 0 to the classes 2 and 3.

The second circuit 14 is designed to have a standard token of 25, and an additional standard token of 20.

In the above-mentioned conditions, the class 1 has a token of 5 (30−25=5), the class 2 has a token of −2(23−25=−2), the class 3 has a token of −2 (23−25=−2), and the class 4 has a token of 20. The reason that the class 4 has a token of 20 is that a token is equalized to a maximum token (20), because a time-out flag associated with the class 4 indicates one (1).

Herein, a token is a parameter used for the purpose of explanation, and is not stored in the parameter memory 10. If a token is equal to or greater than zero, the transmission allowance bit SS is set equal to one (1), and if a token is smaller than zero, the transmission allowance bit SS is set equal to zero (0).

It is assumed in the above-mentioned initial conditions that a packet having a packet length of 24 and belonging to the class 1 has been transmitted.

The first circuit 12 receives an output class number OC and a packet length PL from the packet-reading controller 3, and then, carries out a process of subtraction of a token, as having been explained as the second process with reference to FIG. 6. Specifically, the first circuit 12 subtracts 8 obtained by dividing a packet length of 24 by a weight of 3, from a token of 30, and newly has a token of 22. Since the thus updated token of 22 is smaller than the standard token of 25, the first circuit 12 transmits a request to the bit updating circuit 15 to turn the transmission allowance bit SS into zero.

The resultant parameters are shown in FIG. 8B.

Then, it is assumed that when the parameters stored in the parameter memory 10 are those shown in FIG. 8B, a packet having a packet length of 32 and belonging to the class 4 has been transmitted.

The first circuit 12 sets a token equal to a sum of a maximum token and a standard token (20+25=45), because the time-out flag associated with the class 4 indicates one (1).

Then, the first circuit 12 subtracts 8 obtained by dividing a packet length of 32 by a weight of 4, from a token of 45. As a result, there is obtained an updated token of 37 (45−8=37). Since the updated token of 37 is greater than the standard token of 25, the first circuit 12 transmits a request to the bit updating circuit 15 to turn the transmission allowance bit SS into one (1). The transmission allowance bit associated with the class 4 remains equal to one (1)

Furthermore, the first circuit 12 turns the time-out flag associated with the class 4 into zero.

The resultant parameters are shown in FIG. 8C.

Then, it is assumed that when the parameters stored in the parameter memory 10 are shown as those in FIG. 8C, the token administrator 6A receives a request of addition of a token from the scheduler 5.

On receipt of such a request, the token administrator 6A subtracts the additional standard token of 20 from the standard token of 25 to thereby have an updated standard token of 5. Since a token in each of classes is designed to have the unit of A/B where A indicates a byte, and B indicates a weight, subtraction of 20 from the standard token of 25 is equivalent to addition of an additional token which is in proportion to a weight, to a token.

As a result, since tokens of all of classes are greater than the standard token, the second circuit 14 transmits a request to the bit updating circuit 15 to set transmission allowance bits of all of classes equal to one (1).

The resultant parameters are shown in FIG. 8D.

In FIG. 8D, the time-out flag associated with the class 4 indicates one (1). This means that if the time-out monitoring circuit 13 carries out the above-mentioned third process, namely, a process of judging whether it is time-out, while the parameters shown in FIG. 8C are turned into the parameters shown in FIG. 8D, the time-out flag would stop indicating zero, and indicate one (1).

In the packet scheduling apparatus in accordance with the first embodiment, a process of carrying out addition of a token is replaced with a process of carrying out subtraction of a standard token. This makes it no longer necessary for the packet scheduling apparatus to include an adder or subtraction circuit for each of classes. In addition, only if the packet scheduling apparatus had a single adder circuit and a single subtraction circuit for all of classes, it would be possible to increase a number of classes without an increase in a size of circuits equipped in the packet scheduling apparatus. Thus, the packet scheduling apparatus in accordance with the first embodiment can deal with hundreds of classes without an increase in a size of circuits equipped in the apparatus in comparison with the conventional packet scheduling apparatus.

SECOND EMBODIMENT

An apparatus for scheduling packets, in accordance with the second embodiment has the same structure as the structure of the conventional apparatus for scheduling packets, illustrated in FIG. 1 except including a token administrator 6B in place of the token administrator 6 illustrated in FIG. 1. Accordingly, hereinbelow is explained only the token administrator 6B in the second embodiment.

Figure 9:
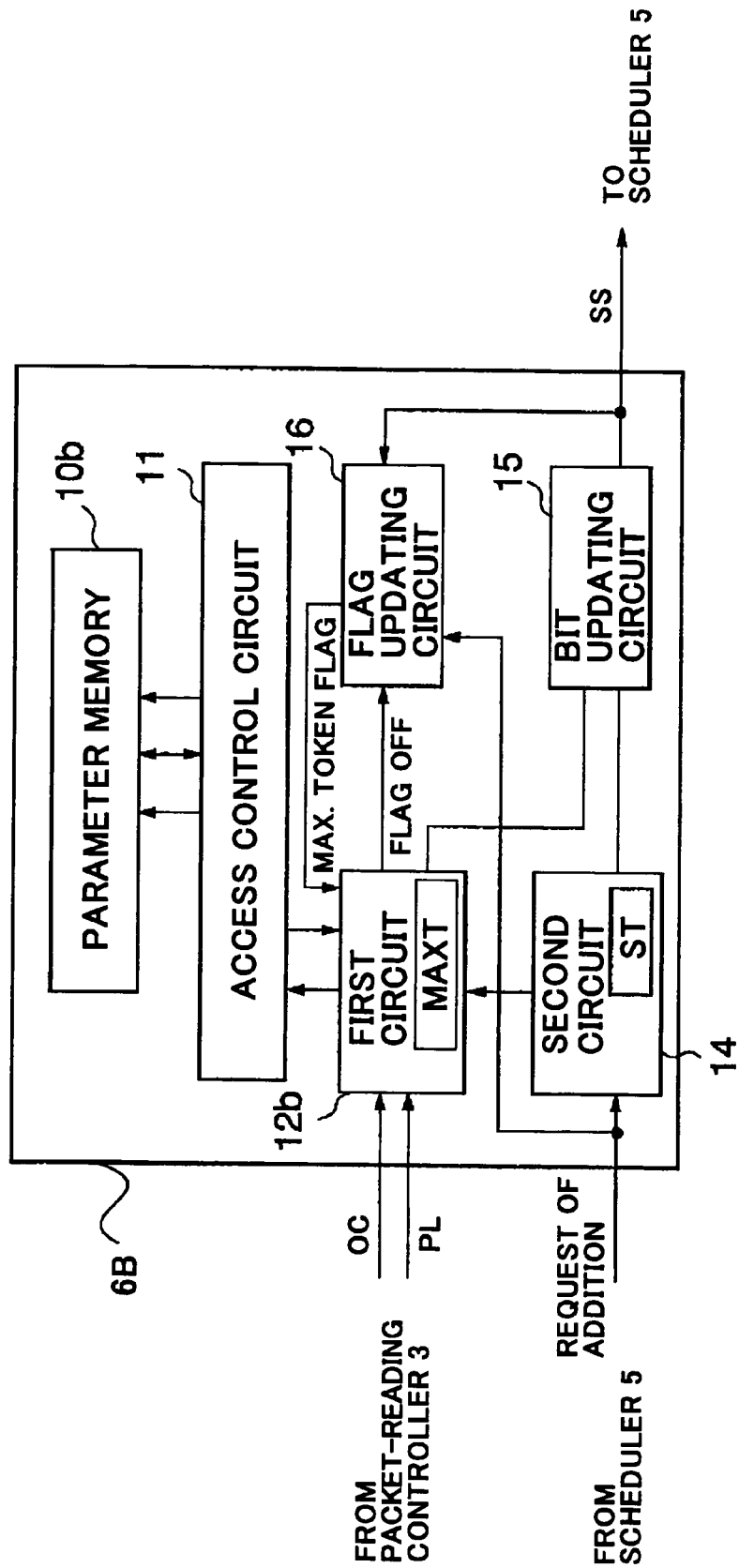
FIG. 9 is a block diagram of a token administrator which is a part of the apparatus for scheduling packets, in accordance with the second embodiment of the present invention.

FIG. 9 is a block diagram of the token administrator 6B in the second embodiment.

The token administrator 6B is comprised of a parameter memory 10b, a circuit 11 which controls access to the parameter memory 10b, a first circuit 12b for carrying out subtraction of a token, a second circuit 14 for carrying out addition of a token, a circuit 15 which updates a transmission allowance bit, and a circuit 16 which updates a maximum token flag.

The parameter memory 10b stores a parameter table including parameters for each of classes. The parameter table includes a token and weight, but does not include a maximum token and a time-out flag.

The first circuit 12 stores a maximum token MAXT common to all of classes. The maximum token MAXT is equal to an additional standard token used in the first process of carrying out addition of a token.

When the first circuit 12b carries out a process of subtraction of a token, the first circuit 12b receives a maximum token flag from the flag updating circuit 16. If a maximum token flag of an associated class indicates one (1), the first circuit 12b equalizes a token to a sum of a maximum token and a standard token, to thereby carry out a process of subtraction of a token.

After carrying out a process of subtraction of a token, the first circuit 12b transmits a request to the flag updating circuit 16 to set a maximum token flag of an associated class equal to zero.

The flag updating circuit 16 stores maximum token flags associated with the classes. Each of the maximum token flags initially indicate one (1), and if each of the maximum token flags initially indicate one (1), it means that a token of an associated class is a maximum token.

The flag updating circuit 16 set a maximum token flag of an associated class equal to zero in compliance with a request transmitted from the first circuit 12b. On receipt of a request of addition of a token from the scheduler 5, the flag updating circuit 16 updates a value indicated in a maximum token flag into a value identical with a transmission allowance bit series SS transmitted from the bit updating circuit 15.

Hereinbelow is explained the reason why the flag updating circuit 16 updates a value indicated in a maximum token flag into a value identical with a transmission allowance bit series SS transmitted from the bit updating circuit 15, on receipt of a request of addition of a token from the scheduler 5.

On receipt of a request of addition of a token, the first circuit 14 updates a present standard token into a standard token defined as (A-B) where A indicates a standard token and B indicates an additional standard token. Since a token is defined as (C-D) where C indicates a present token and D indicates a standard token, a token would be increased by the addition standard token, if the standard token were decreased by the additional standard token. Since the additional standard token is set equal to the maximum token in the second embodiment, an increase of a token by the additional standard token is equivalent to addition of a token to the maximum token.

If a token were greater than zero, that is, a token were greater than the standard token, a token to which the maximum token was added would be greater than the maximum token. Accordingly, a token has to be equalized to the maximum token.

In addition, if a token were greater than zero, that is, a token were greater than the standard token, a transmission allowance bit output from the flag updating circuit 16 would indicate one (1). That is, a class in which a maximum token flag has to be updated into one (1) on receipt of a request of addition of a token is a class in which the transmission allowance bit series SS transmitted from the bit updating circuit 15 indicates one (1).

Figure 10:
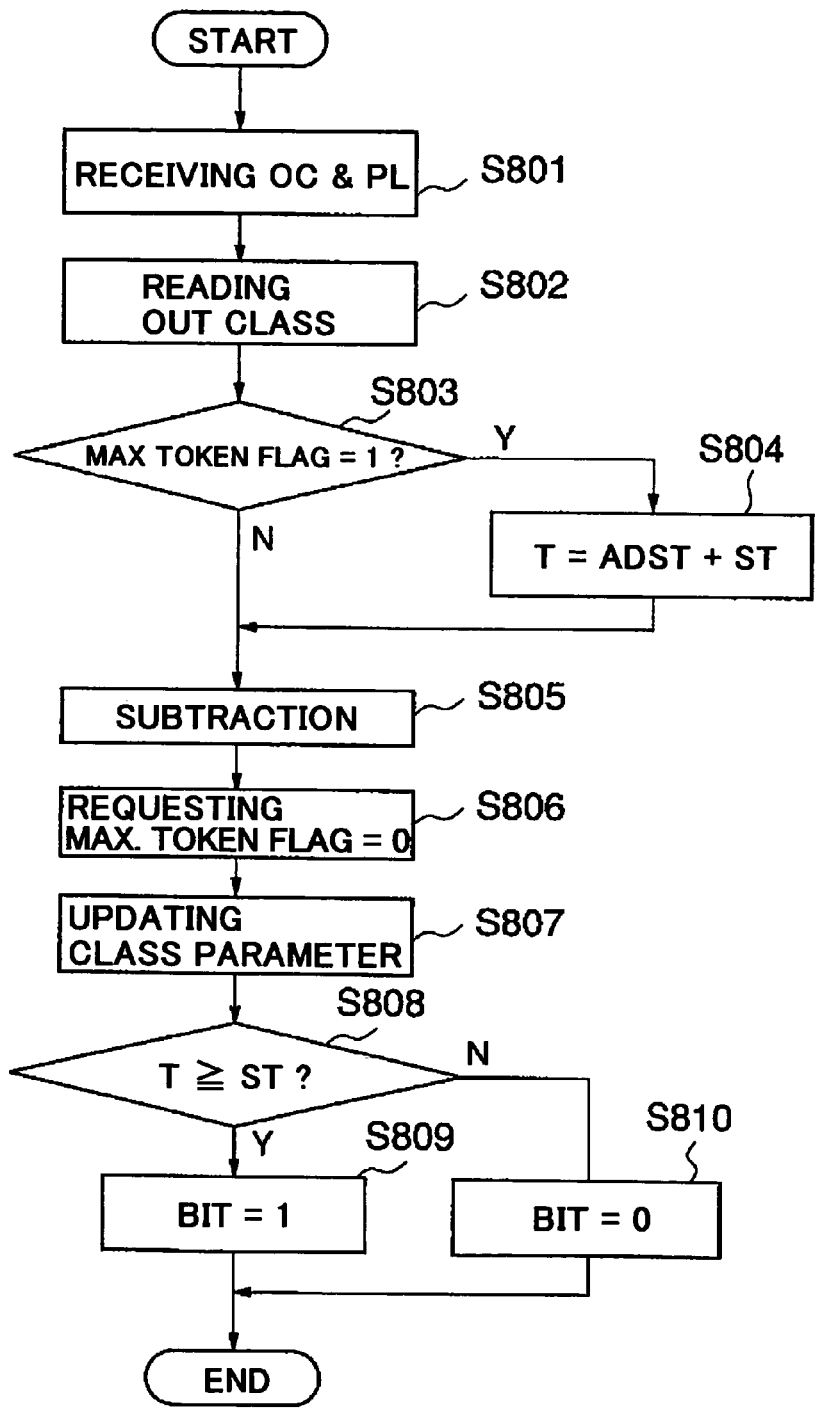
FIG. 10 is a flow chart of a process of subtraction of a token, carried out by the token administrator illustrated in FIG. 9.

FIG. 10 is a flow chart showing an operation of the first circuit 12b in the token administrator 6B in the second embodiment. Hereinbelow is explained an operation of the first circuit 12b with reference to FIG. 10.

The first circuit 12b receives an output class number OC and a packet length from the packet-reading controller 3, in step S801.

On receipt of them, the first circuit 12b reads parameters of a class identified by the output class number OC, out of the parameter memory 10b through the access control circuit 11, in step S802.

Then, the first circuit 12b checks whether a maximum token flag received from the flag updating circuit 16 indicates one (1), in step S803.

If the maximum token flag indicates one (1) (YES in step S803), the first circuit 12b equalizes a token T to a sum of a maximum token MAXT and a standard token ST, in step S804. Herein, a maximum token MAXT is equal to an additional standard token ADST.

Then, the first circuit 12b subtracts A/B from a token, in step S805, where A indicates a packet length, and B indicates a weight.

If the maximum token flag does not indicate one (1) (NO in step S803), the first circuit 12b subtracts the above-mentioned A/B from a token, in step S805.

Then, the first circuit 12b requests the flag updating circuit 16 to set a maximum token flag equal to zero, in step S806.

Then, the first circuit 12b updates a token in the associated class, stored in the parameter memory 10b, through the access control circuit 11, in step S807.

Then, the first circuit 12b checks whether a token T is equal to or greater than a standard token ST, in step S808.

If a token T is equal to or greater than the standard token ST (YES in step S808), the first circuit 12b requests the flag updating circuit 16 to set a transmission allowance bit to be one (1), in step S809. If a token T is smaller than the standard token ST (NO in step S808), the first circuit 12b requests the flag updating circuit 16 to set a transmission allowance bit to be zero (0), in step S810.

In the packet scheduling apparatus in accordance with the second embodiment, it is not necessary to monitor a time-out flag. Hence, the packet scheduling apparatus in accordance with the second embodiment can be fabricated smaller in a circuitry size than the packet scheduling apparatus in accordance with the first embodiment.

In addition, it is no longer necessary to make access to the parameter memory 10b for carrying out the above-mentioned third process, that is, the process of carrying out judgment as to whether it is time-out, and hence, it would be possible to increase an operation rate of the packet scheduling apparatus in one cycle.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-151975 filed on May 22, 2001 including specification, claims, drawings and summary is incorporated herein by reference in its entirety.

What is claimed is:

1. An apparatus for scheduling packets for presenting a plurality of classes, comprising:
   (a) a buffer which accumulates received packets in each of said classes;
   (b) a token administrator which judges whether it is allowed to transmit a packet in each of said classes by virtue of a token associated with each of said classes;
   (c) a scheduler which determines a class to which a packet to be transmitted belongs, based on the judgment carried out by said token administrator; and
   (d) a controller which reads a packet of the class determined by said scheduler, out of said buffer, and transmits the thus read-out packet,
   said token administrator including a single first circuit for carrying out subtraction of a token and a single second circuit for carrying out addition of a token,
   said token administrator carrying out subtraction and addition of a token for each of said classes by means of said single first circuit and said single second circuit.

2. The apparatus as set forth in claim 1, wherein said token administrator allows transmission of a packet if said token is equal to or greater than a predetermined token, and does not allow transmission of a packet if said token is smaller than said predetermined token,
   said token administrator defines A/B as a unit of said token, wherein A indicates bytes and B indicates a weight, such that when said token administrator adds an additional token to each of tokens associated with each of said classes in accordance with a weight of each of said classes, in compliance with a request from said scheduler, an additional token can be added to each of tokens associated with each of said classes in accordance with a weight of each of said classes, if only said predetermined token is reduced by a certain value, and said second circuit reduces said predetermined token by a certain value in compliance with said request.

3. The apparatus as set forth in claim 1, wherein said first circuit receives an output class number and a packet length from said controller, and subtracts a token defined in accordance with said packet length from a token associated with a class defined by said output class number.

4. The apparatus as set forth in claim 1, wherein said token administrator includes:
   (b1) a parameter memory storing therein a token of each of said classes;
   (b2) a first circuit which receives an output class number and a packet length from said controller, reads a token of a class identified by said output class number, out of said parameter memory, subtracts a subtractive token determined in accordance with said packet length, from the thus read-out token, writes a resultant token into said parameter memory, compares said resultant token to a predetermined token, and transmits a first request of transmitting a packet, based on the result of the comparison,
   (b3) a second circuit which reduces said predetermined token by a certain degree in compliance with a request transmitted from said scheduler to thereby substantially increase a token, and transmits a second request of transmitting a packet; and
   (b4) a third circuit which produces a bit series indicative of whether a packet of each of said classes is allowed to be transmitted, on receipt of said first and second requests.

5. The apparatus as set forth in claim 1, wherein said token administrator further includes an access control circuit which administers access to said parameter memory.

6. The apparatus as set forth in claim 1, wherein said token administrator further includes a time-out monitoring circuit which periodically monitors a token of each of said classes stored in said parameter memory, judges whether it is timed out or not, based on a maximum token defined in each of said classes, and stores a time-out flag in said parameter memory in association with said token,
   and wherein said first circuit, when said token read out of said parameter memory is associated with said time-out flag, converts said token into a token defined in accordance with said maximum token, and subtracts said subtractive token from the thus converted token to thereby newly have a token.

7. The apparatus as set forth in claim 1, wherein said token administrator further includes a fourth circuit for updating a maximum token flag, which, on receipt of a request of addition of a token from said scheduler, turns on a class allowed to be transmitted by said bit series among maximum token flags associated with said classes, and turns off a maximum token flag associated with a class identified with a request transmitted from said first circuit,
   and wherein said first circuit stores a maximum token common in all of said classes, searches a maximum token flag associated with a class identified by an output class number transmitted from said controller, among the maximum token flags stored in said fourth circuit, converts said token read out of said parameter memory, into a predetermined token, if said maximum token flag is on, and subtracts a subtractive token from the thus converted token to newly have a token.

8. A token administrator, used in a packet scheduling apparatus which presents a plurality of classes, which increases a token associated with each of classes in accordance with a weight of each of classes in compliance with a request from a scheduler, and reduces a token associated with a class to which a packet transmitted in accordance with a signal transmitted from a controller belongs, in accordance with a length of said packet,
   said token administrator including:
   (a) a parameter memory storing therein a token of each of said classes;
   (b) a first circuit which receives an output class number and a packet length from said controller, reads a token of a class identified by said output class number, out of said parameter memory, subtracts a subtractive token determined in accordance with said packet length, from the thus read-out token, writes a resultant token into said parameter memory, compares said resultant token to a predetermined token, and transmits a first request of transmitting a packet, based on the result of the comparison,
   (c) a second circuit which reduces said predetermined token by a certain degree in compliance with a request transmitted from said scheduler to thereby substantially increase a token, and transmits a second request of transmitting a packet; and
   (d) a third circuit which produces a bit series indicative of whether a packet of each of said classes is allowed to be transmitted, on receipt of said first and second requests.

9. The token administrator as set forth in claim 8, further comprising an access control circuit which administers access to said parameter memory.

10. The token administrator as set forth in claim 8, further comprising a time-out monitoring circuit which periodically monitors a token of each of said classes stored in said parameter memory, judges whether it is timed out or not, based on a maximum token defined in each of said classes, and stores a time-out flag in said parameter memory in association with said token,
    and wherein said first circuit, when said token read out of said parameter memory is associated with said time-out flag, converts said token into a token defined in accordance with said maximum token, and subtracts said subtractive token from the thus converted token to thereby newly have a token.

11. The token administrator as set forth in claim 8, further comprising a fourth circuit for updating a maximum token flag, which, on receipt of a request of addition of a token from said scheduler, turns on a class allowed to be transmitted by said bit series among maximum token flags associated with said classes, and turns off a maximum token flag associated with a class identified with a request transmitted from said first circuit,
    and wherein said first circuit stores a maximum token common in all of said classes, searches a maximum token flag associated with a class identified by an output class number transmitted from said controller, among the maximum token flags stored in said fourth circuit, converts said token read out of said parameter memory, into a predetermined token, if said maximum token flag is on, and subtracts a subtractive token from the thus converted token to newly have a token.

12. A method of scheduling packets for presenting a plurality of classes, comprising the steps of:

(a) accumulating received packets in each of said classes;

(b) judging whether it is allowed to transmit a packet in each of said classes by virtue of a token associated with each of said classes; and (c) determining a class to which a packet to be transmitted belongs, based on the judgment carried out in said step (b), wherein said token has A/B as a unit thereof wherein A indicates bytes and B indicates a weight, ensuring that a step of adding a token defined in accordance with a weight of each of said classes, to a token of all of said classes can be carried out by adding the same token to said classes.

13. The method as set forth in claim 12, further comprising the steps of:

allowing transmission of a packet only when said token is equal to or greater than a predetermined token; and reducing said predetermined token by a certain degree to thereby make it no longer necessary to add a token defined in accordance with a weight of each of said classes, to tokens of said classes.

14. The method as set forth in claim 12, further comprising the steps of:

reducing said predetermined token by said certain degree, if necessary; and reducing a token associated with a class to which a packet having been transmitted belongs, by a length of said packet divided by a weight of said class.

* * * * *